US012096546B2

(12) United States Patent
Riccardi et al.

(10) Patent No.: US 12,096,546 B2
(45) Date of Patent: Sep. 17, 2024

(54) METHOD FOR THE GENERATION UNDER DYNAMIC CONDITIONS OF AN ATMOSPHERIC PLASMA WITH A LOW OZONE CONTENT AND A SURFACE DISCHARGE SYSTEM WITH DIELECTRIC BARRIER FOR THE REALIZATION OF THE METHOD

(71) Applicant: PLUME S.R.L., Milan (IT)

(72) Inventors: Claudia Riccardi, Milan (IT); Elisa Dell'orto, Calusco d'Adda (IT); Matteo Daghetta, Vigevano (IT)

(73) Assignee: PLUME S.R.L., Milan (IT)

( * ) Notice: Subject to any disclaimer, the term of this patent is extended or adjusted under 35 U.S.C. 154(b) by 735 days.

(21) Appl. No.: 17/285,223

(22) PCT Filed: Oct. 17, 2019

(86) PCT No.: PCT/IB2019/058851

§ 371 (c)(1),
(2) Date: Apr. 14, 2021

(87) PCT Pub. No.: WO2020/079628

PCT Pub. Date: Apr. 23, 2020

(65) Prior Publication Data

US 2021/0392734 A1 Dec. 16, 2021

(30) Foreign Application Priority Data

Oct. 17, 2018 (IT) ........................ 102018000009541

(51) Int. Cl.
*H05H 1/24* (2006.01)

(52) U.S. Cl.
CPC ........ *H05H 1/2418* (2021.05); *H05H 1/2439* (2021.05)

(58) Field of Classification Search
CPC ........................................................ H05H 1/24
See application file for complete search history.

(56) References Cited

U.S. PATENT DOCUMENTS

2016/0230783 A1 8/2016 Onishi et al.

FOREIGN PATENT DOCUMENTS

WO 2007/106863 A2 9/2007

OTHER PUBLICATIONS

M. Simek et al., Influence of Power Modulation on Ozone Production Using an AC Surface Dielectric Barrier Discharge in Oxygen, 30 Plasma Chem. Plasma Process. 607-617 (2010).*
M. Simek et al., Ozone Production Using a Power Modulated Surface Dielectric Barrier Discharge in Dry Synthetic Air, 32 Plasma Chem. Plasma Process. 743-754 (2012).*
International Search Report and Written Opinion for corresponding Application No. PCT/IB2019/058851 (mailed Feb. 12, 2020).
International Preliminary Report on Patentability for corresponding Application No. PCT/IB2019/058851 (mailed Feb. 1, 2021).
Thomas et al., "Plasma Actuators for Cylinder Flow Control and Noise Reduction," AIAA J. 46(8):1921-1931 (2008).

* cited by examiner

*Primary Examiner* — Randy Boyer
(74) *Attorney, Agent, or Firm* — Troumant Pepper Hamilton Sanders LLP

(57) ABSTRACT

The present invention relates to a method for generating atmospheric plasmas not in thermodynamic equilibrium with the control of ozone generation and, in particular, the generation of atmospheric plasmas not in thermodynamic equilibrium with a production of ozone contained below 0.5 ppmv, and preferably below the limit of 0.2 ppmv.

8 Claims, 2 Drawing Sheets

METHOD FOR THE GENERATION UNDER DYNAMIC CONDITIONS OF AN ATMOSPHERIC PLASMA WITH A LOW OZONE CONTENT AND A SURFACE DISCHARGE SYSTEM WITH DIELECTRIC BARRIER FOR THE REALIZATION OF THE METHOD

This application is a national stage application under 35 U.S.C. § 371 of PCT Application No. PCT/IB2019/058851, filed Oct. 17, 2019, which claims the priority benefit of Italian Patent Application No. 102018000009541, filed Oct. 17, 2018, which are hereby incorporated by reference in their entirety.

FIELD OF THE INVENTION

The present invention relates to the use of plasmas produced by a surface discharge type system with dielectric barrier in air under dynamic conditions, with a limited production of ozone. The invention also relates to the system for the realization of the method.

BACKGROUND

The atmospheric plasmas not in thermodynamic equilibrium, also called cold plasmas, are normally generated in air or mixtures of air with other gases and are used for various application purposes. These plasmas are in a thermodynamic non-equilibrium since they are formed by free electrons that can reach temperatures even of thousands of Kelvin, and ions and neutral molecules which instead are essentially at room temperature.

A system that has been known for a long time for the generation of cold plasmas is the dielectric barrier discharge, generally known with the definition Dielectric Barrier Discharge or with the acronym DBD. This system consists of two facing and opposite electrodes, of which at least one is covered by a layer of a dielectric material (for example a ceramic or mica), separated by a distance generally of the order of centimeters in which the gas in which plasma is formed is present.

The historically most important application of atmospheric plasmas concerns the production of ozone, an oxidizing gas that is toxic to living beings. The use of a plasma for the generation of ozone is described for example in U.S. Pat. No. 9,067,788B1.

Ozone is not stable over the long period and is therefore not sold in cylinders like other industrial gases but is generally produced at the time of use through devices called ozonizers.

In a plasma in air or air mixtures generated at atmospheric pressure, ozone is mainly produced through the following reaction:

$$O.+O_2 \rightarrow O_3$$

in which the O. species (an oxygen radical) is produced by homolytic cleavage of the $O_2$ oxygen molecule, due to the collisions with plasma electrons. The ozone thus formed then takes part in numerous different reactions involving both neutral species, such as O. and $O_2$ or other neutral species present in the air (for example $N_2$) or produced in the same plasma (for example N. or NOR, where x≥1), and all charged species, i.e. electrons, positive and negative ions. In the presence of humidity the ozone also reacts with $H_2O$, and the species derived in the plasma phase are for example the radical OH and $H_2O_2$.

Ozone is used to disinfect water in aqueducts and swimming pools, surfaces intended to come into contact with food, or to disinfect air or fruit and vegetables from mold and yeast spores. Ozone is also used for cleaning and bleaching fabrics, in the surface treatment of plastic materials and other materials to allow the adhesion of other substances or to increase biocompatibility, and in the medical field in ozone therapy, proposed for the treatment of various diseases, including for example multiple sclerosis, arthritis, heart diseases, Alzheimer's disease and chronic hepatitis. Another use of ozone is in the sanitisation of environments, for example industrial environments or hospital operating theatre rooms; in these applications ozone is generally introduced into the environment to be treated at times when no people are present, typically at night, and the flow of ozone is interrupted before people return to the rooms, so that the concentration of the gas falls within levels that are not toxic to humans following its degradation by reaction with other present gases.

DBD type systems have been used for the production of ozone both in continuous and intermittent mode, defined in the sector as "pulsed". In pulsed mode, the power supply of the system is carried out according to switch-on and switch-off cycles. In the DBD systems it was observed that, with a pulsed power supply with switch-on periods in the order of one millisecond and switch-off periods of some milliseconds, there was an increase in the production of ozone compared to systems supplied in continuous mode.

A system different from the traditional DBD for the production of cold plasmas, developed more recently, is the surface discharge system with dielectric barrier, generally known as Surface Dielectric Barrier Discharge or SDBD. In an SDBD type system the two electrodes, separated by a dielectric material, are not facing, that is, they do not overlay in a view in a direction perpendicular to the main plane of the dielectric material; the dielectric material also leaves at least one of the two electrodes exposed to the surrounding gas (generally air). In the area of the plasma generated by an SDBD system, a net flow of gas is produced, which can reach speeds of even a few meters per second.

Until now, SDBD systems have been mainly studied to improve the aerodynamics of aircraft wings or turbine blades, but can be applied in all cases where the movement of air is required, for example in air conditioning and air purification systems, heat exchangers or air mixers.

The article "Plasma actuators for cylinder flow control and noise reduction", F.O. Thomas et al., AIAA Journal, Vol. 46, No. 8 (2008), and patent application WO 2007/106863 A2, the content of which essentially corresponds to said article, describe the use of SDBD type systems to modify the separation of air flows around elements with poor aerodynamic efficiency of aircrafts, such as the carriage or the supports of the reactors fixed to the wings; the aim is to reduce the noise generated by the aircrafts during take-off and landing.

Patent application US 2016/0230783 A1 describes the use of SDBD systems arranged on wind turbine blades, with the dual function of maintaining the correct orientation of the turbine with respect to the wind direction and, also in this case, of reducing the noise connected to the operation of the turbine.

One problem encountered with cold plasma production systems is the generation of excessive amounts of ozone. As mentioned, ozone is toxic, so the concentration thereof in the air must be kept below prefixed levels.

The European Directive 2008/50/EC has set some limits for the amount of ozone allowed in working environments.

These limits depend on the physical activity carried out by workers and operators exposed to ozone, and are 0.2 ppmv (parts per million in volume) for heavy, moderate or light work done over a period of less than 2 hours; 0.1 ppmv for light work; 0.08 ppmv for moderate work; and 0.05 ppmv for heavy work considering a period of 8 hours.

All discharges and plasmas produced at atmospheric pressure not in a thermodynamic equilibrium generate ozone in variable amounts, but always above the maximum permitted limit of 0.2 ppmv. In all these applications, an ozone abatement system (aspirators, getters, . . . ) and a plasma containment chamber are necessary to avoid contamination with the external environment. This makes the development of civil or household air movement systems based on SDBD complicated at the moment.

Patent application US 2013/0026137 A1 shows an example of a plasma production system for application in the medical field; in paragraph [0020] of this document it is said that by operating with the described system it is possible to minimize the amount of ozone generated, producing however the plasma in noble gases, a condition applicable only under particular conditions and for small systems.

The object of the present invention is to provide an SDBD type system and a method for the use thereof which allow the generation of a surface atmospheric plasma with low ozone content.

SUMMARY OF THE INVENTION

This object is achieved by the present invention, which in a first aspect thereof relates to a method for producing a cold plasma with an ozone content lower than 0.5 ppmv with a system in configuration Surface Dielectric Barrier Discharge, consisting in creating a plasma in an oxygen-containing gas at a pressure between 0.9 and 2 bar, feeding two electrodes that generate the plasma with alternate tension in an intermittent mode depending on the relative humidity of the gaseous medium, such that the relation is met:

$$E=P\times DC/Q\leq 0.5 \quad (1)$$

wherein

- P is the nominal power in Watt delivered by the tension generator system;
- DC is a number higher than 0 and equal to or lower than 0.95; it is the fraction of time during which the power P is actually transferred to the system, and is defined by the relation $DC=t_{ON}/(t_{ON}+t_{OFF})$, in which $t_{ON}$ is the duration of the period in which power is transferred to the system and $t_{OFF}$ is the duration of the period in which there is no power transfer to the system;
- Q is the total flow rate of air circulating in the system, measured in cubic meters per hour.

For convenience in the present description the product P×DC/Q is indicated synthetically with the parameter E, which has units of measurement $W\cdot h/m^3$.

In a second aspect thereof, the invention relates to a system for the production of an atmospheric cold plasma comprising:

a system for generating a plasma in configuration Surface Dielectric Barrier Discharge, formed of two electrodes separated by a dielectric material;

an alternate tension generator connected to the two electrodes; and a device for imparting an intermittent delivery of tension to the two electrodes.

BRIEF DESCRIPTION OF THE FIGURES

The invention will be described in the following with reference to the figures, in which.

DETAILED DESCRIPTION OF THE INVENTION

The present invention relates to a method for generating atmospheric plasmas not in a thermodynamic equilibrium with the control of ozone generation and, in particular, the generation of atmospheric plasmas not in thermodynamic equilibrium with a production of ozone maintained below the limit of 0.5 ppmv, and preferably below the limit of 0.2 ppmv.

The inventors have discovered that, surprisingly, operating in SDBD mode and intermittently under the conditions defined by the relation (1) above mentioned, it is possible to generate an atmospheric plasma with an ozone content lower than 0.5 ppmv, or even with an ozone content that does not exceed the legal limit of 0.2 ppmv. The method of the present invention is surprising in that in the sector pulsed systems for the production of plasmas are already known, but these systems give rise to an increase, rather than a reduction, in the production of ozone.

The new generation of plasmas produced according to the present invention can therefore have vast applications, from the treatment for air purification to the treatment of surfaces, without providing for an ozone abatement system, and in all cases in which it is not desired to work with an ozone amount above the permitted limit, or the ozone content is to be controlled in a specific way without the need to use additional systems to control the amount of this gas, for example containment chambers; this last mode is particularly useful for treating environments at times when they are not occupied by people, and in which it is possible for example to introduce a controlled ozone concentration of 0.5 ppmv into the environment to accelerate and make the sanitisation of the environment more effective.

The method of the invention consists in pulsing a plasma produced in SDBD configuration by feeding the discharge at temporal intermittence, i.e. interrupting the power supply for short periods, operating in such a way that the relation (1) is met, i.e. $E\leq 0.5\ W\cdot h/m^3$.

Figure 1A:
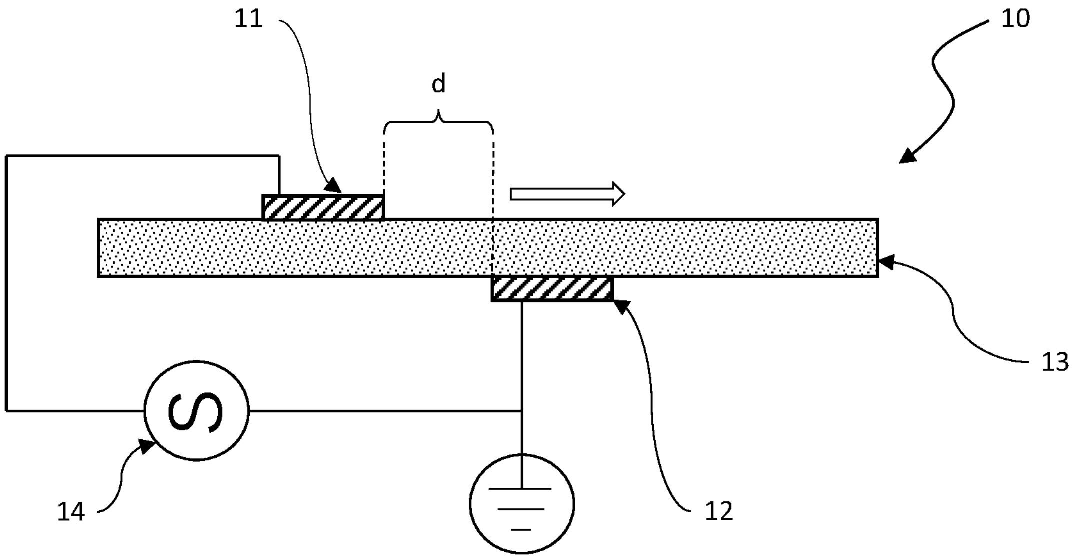
FIG. 1*a* schematically shows in section the geometry of a plasma generating unit in SDBD mode.

A plasma generation system in SDBD configuration is represented schematically in section in FIG. 1*a*. The system, 10, consists of two electrodes, 11 and 12, separated by a dielectric material, 13, and connected to a low-frequency alternate tension generator 14; electrode 12 is also connected to earth. The thickness of electrodes 11 and 12 can be between about 10 μm and 1 cm; the dielectric material 13 can have a thickness varying between a few micrometers and a few centimeters. The extension of the electrodes (width and length) are variable, depending on the volume of plasma to be generated. The two electrodes are staggered, i.e. in such a configuration that in a view perpendicular to the system, the tracks of the two electrodes do not overlay or overlay by a few millimeters; preferably, the distance between the two electrodes in the plane of the dielectric material, indicated with “d” in the figure, is between 1 and 10 mm, and even more preferably lower than 5 mm; in the case of partial overlay, the parameter “d” takes on a negative value.

By applying tension to the electrodes, a net flow of plasma is generated with a direction almost parallel to the dielectric material, with a direction going from the conductor connected to the hot pole towards the conductor connected to the cold or ground (direction of the arrow in the figure). The polarity of the electrical connections can be reversed, resulting in the inversion of the direction of the plasma flow.

The tension applied to the electrodes is alternating, with a frequency between 1 and 500 kHz.

The powers of use depend on the thickness of the dielectric material and the size of the electrodes. For example, for a system composed of a 12×12 $cm^2$ teflon dielectric material of a millimetric thickness provided with 12×2 $cm^2$ sized electrodes and a thickness lower than a millimeter, powers in continuous mode in the range between a few watts up to tens of watts are used.

The parameters that allow controlling the generation of ozone below the limits indicated above are the power P applied to the electrodes, the value DC, and the total air flow circulating in the system, Q.

The applied power is preferably commensurate with the dimensions of the electrodes in the direction of the flow generated by them. The power value per unit length of the electrode, W/cm, is indicated in the present text as Pf, and characteristic values of this parameter for the operation of the method of the invention are between 2 and 6 W/cm.

DC is a parameter comprised in the range $0<DC\leq0.95$ as defined above and indicates the fraction of time in which the electrodes are fed by the system electronics. DC can also be expressed as a percentage value, where for example 50% corresponds to 0.5 and 100% to 1.

The term DC stands for “duty cycle” and is defined by the relation $t_{ON}/(t_{ON}+t_{OFF})$, in which $t_{ON}$ indicates the time in which power is supplied to the electrodes and $t_{OFF}$ indicates the time in which the power supply is interrupted. DC is therefore the fraction of time in which the power P is applied to the electrodes and in which the plasma is generated. The overall period of treatment of the air with SDBD plasma according to the invention consists of a sequence of time intervals of $t_{ON}$ duration and time intervals of $t_{OFF}$ duration. While the treatments according to the invention typically have durations on macroscopic time scales (seconds or minutes, or even longer times depending on the applications), the time scales of $t_{ON}$ and $t_{OFF}$ are in the range between milliseconds and seconds. Typically the DC value can be varied in the range from 0.1 to 0.95, with switch-off times $t_{OFF}$ ranging from hundreds of microseconds to a few seconds and switch-on times $t_{ON}$ ranging from hundreds of microseconds to a few seconds.

Characteristic values of $t_{OFF}$ are ≥0.25 ms, preferably >1 ms, and generally ≥500 ms.

The $t_{ON}$ value is determined by the $t_{OFF}$ value and the DC value that one wishes to obtain, according to the above-mentioned relation.

In the simplest embodiment of the method, uniform switch-on and switch-off cycles, determined by constant $t_{ON}$ and $t_{OFF}$ values, are applied throughout the treatment time. However, it is also possible to use variable cycles; for example, it is possible to impose additional $t_{OFF}$ periods of duration greater than or equal to 1000 ms every n cycles, with n>5.

In addition to the plasma parameters, the ozone content depends on the overall flow rate Q, i.e. the quantity of air in $m^3/h$ that flows near the plasma itself.

The overall gas flow rate in the system is given by the sum of the flow rate imposed from the outside and that generated by the plasma itself; that is, one has $$Q=Q_e+Q_p$$

where $Q_e$ is the flow rate determined by an external air movement system and $Q_p$ is the flow rate generated by the plasma.

The term $Q_p$ typically varies between 0.1 and 1 $m^3/h$.

The term $Q_e$ can vary within very wide limits: it can be equal to 0, and therefore the flow rate Q of the system will be only that determined by the flow generated by the plasma. Alternatively, Q may have a contribution due to the movement of air from the outside, therefore $Q_e\neq0$. In this case, $Q_e$ has values that are typically between 1 and 360 $m^3/h$ in small-size systems, for example laboratory systems, but it can reach values in the order of thousands of $m^3/h$ in industrial systems; this value can be further increased by having multiple plasma generation modules in parallel. When $Q_e$ is much higher than $Q_p$, the latter term is negligible and Q is essentially equivalent to $Q_e$.

The DC value is preferably varied as a function of the air flow to be treated: for flow rates Q between 100 and 1000 $m^3/h$ it is preferable to operate with values of DC<0.2, for flow rates Q between 1,000 and 10,000 $m^3/h$ it is preferable to operate with values of DC<0.3, and for flow rates between 10,000 and 100,000 it is preferable to operate with values of DC<0.5.

The inventors have observed that it is possible to keep the production of ozone below the threshold of 0.5 ppmv operating under conditions such that it is E<0.5; it is preferable to operate with a value E≤0.1 W·h/$m^3$, and still more preferably with E≤0.05 W·h/$m^3$.

To give an example, for a flow rate Q of 20,000 $m^3/h$ of air, a system of 6 plasma modules each with 50 W allows treating the air with low ozone content operating with DC=0.5; under these conditions one has:

$$E=(6\times50\times0.5)/20{,}000=0.0075\ \mathrm{W\cdot h/m^3}.$$

In the prior art the SDBD systems are generally used to generate an air displacement and therefore are fed at high powers, and the pulsed mode serves to control the fluid dynamics, not the ozone content; for these reasons the known systems work with values of E that are much higher than those of the present invention. For example, the inventors have calculated the value of E in the system described in the article by F.O. Thomas et al. previously mentioned: considering the reactor volume, the linear power (200 W/m), four 0.5 m modules, a flow rate of 28 $m^3/h$ was estimated, and therefore a parameter E=14.

The inventors have also observed that the method of the invention works reducing the bacterial load in the air with a reduced production of ozone, in a wide range of relative humidity values, which essentially covers all the humidity values commonly found in working or hospital environments, that is air that is not dried or not humidified forcibly and artificially.

The method of the invention, and systems for realising it, can be used in practically all air treatment systems.

For example, a system for realising the method of the invention can be inserted in an air conditioning system, for the sanitisation thereof (for example, in order to prevent cases of legionella due to the diffusion, by these plants, of bacteria that proliferate in the water deposits present therein during periods of inactivity). The inventors have performed tests aimed at measuring the bacterial load in the atmosphere before and after the passage of air in the plasma region. With $t_{OFF}$=5 ms, DC=0.8 and Q=200 $m^3$/h (E=0.139) a reduction in the charge by a factor 10 was obtained.

The generation of ozone in a controlled fashion according to the method of the invention can also be applied to air movement systems; air cooling systems, such as heat exchangers and heat pumps; in plants for the treatment of surfaces of materials without the aid of an ozone abatement device, also decreasing the exposure times of the materials since under the dynamic conditions of the method the material is hit in the unit of time by larger amounts of radical and active species generated in plasma; or, to systems such as gas mixers and blenders.

In all the air treatment systems in which the method of the invention can be applied, the plasma generation apparatus in SDBD mode can consist of a single unit consisting of two electrodes separated by a dielectric material as described above, or by several units arranged in parallel or in series.

The system object of the invention can be used to treat flat materials, flexible materials and three-dimensional objects, limiting the production of ozone and thus avoiding the use of abatement systems for this gas.

Figure 1B:
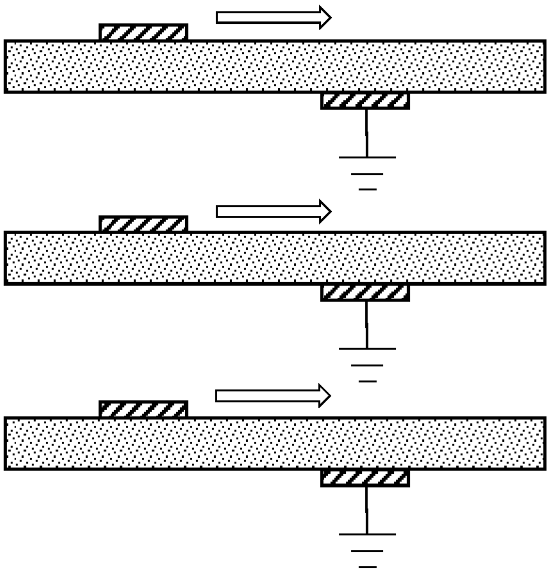
FIG. 1*b* shows a plasma production system consisting of several SDBD units arranged in parallel.

An apparatus according to the invention with several units in parallel is schematized in FIG. 1*b* (for clarity of representation, the reference numbers which correspond to those of FIG. 1*a* are not shown); an apparatus of this type allows increasing the air flow rate which can be treated by the system in a unit of time.

The invention will be further illustrated by the following examples.

The examples show different conditions of production of an SDBD plasma at atmospheric pressure, in the absence or in the presence of an external dynamic air flow (realized for example with a forced suction system); the tests with air flow imposed from the outside are also aimed at simulating the condition of use in a conditioning system or for a heat exchanger.

Example 1

This example refers to the evaluation of the amount of ozone produced as a function of the plasma operating parameters.

The plasma was generated with an SDBD system, composed of a 3 mm thick flat Teflon plate, an electrode composed of a conductive strip with side dimensions 12×3 cm and a thickness of 0.11 mm on one side of the dielectric material and an electrode composed of a block of conductive material with dimensions 12×2×1 cm on the opposite side. The electrodes overlay by about 2 mm. The two electrodes were fed by a high tension generator having 5.8 W power and working at a frequency of 40 kHz.

By feeding the electrodes, a flow of plasma was generated with a direction almost parallel to the dielectric material, with the direction going from the conductor connected to the hot pole towards the conductor connected to the cold one (ground).

The extension of the plasma in the direction parallel to the dielectric material is of a few centimeters and depends on the relative position (offset) of the two electrodes.

Under these conditions, the amount of ozone produced by a system of the invention was evaluated, with a forced air flow from the outside of the system, for two different values of the $t_{OFF}$ parameter and as the DC parameter varies.

The plasma was generated in a dynamic configuration with an external air flow such as to determine an overall flow Q of 50 $m^3$/h; the height of the portion of treated air was 2 cm.

Ozone is detected with an Eco-Sensors sensor model OS-6 (Eco Sensors is a division of KWJ Engineering, Inc. of Newark, Calif., USA), for several DCs. The condition switch-off time $t_{OFF}$=25 ms was studied, with generation times $t_{ON}$ between 0.62 ms and 25 ms.

The pulsed mode mainly modifies the rate of ozone production and, acting also on the $t_{OFF}$ it is possible to modify the saturation of ozone in the plasma.

Figure 2:
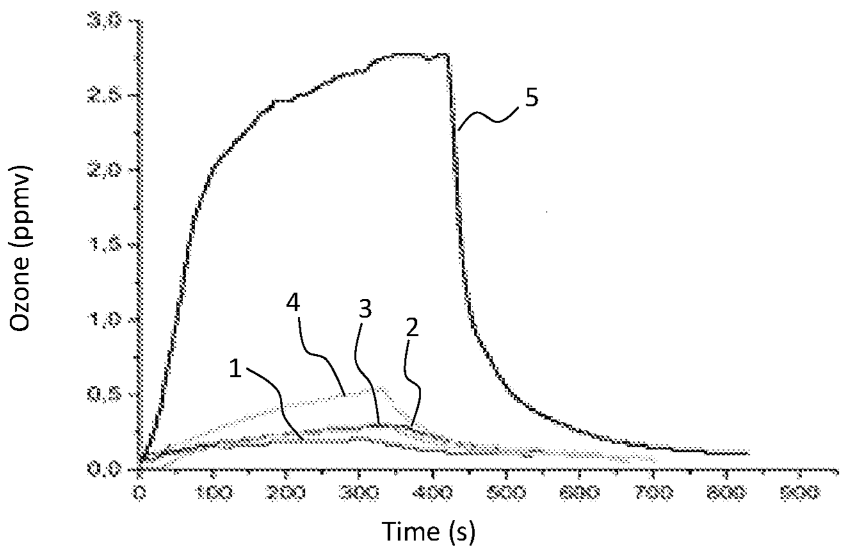
FIGS. 2 and 3 show the dependence of the amount of ozone generated by the DC parameter.

FIG. 2 shows the values of ozone concentration with the variation of time during the discharge of plasma and of the parameters described above. In particular, the curves in the figure have been obtained with the following DC values and the corresponding E values in W·h/$m^3$ (both values vary when $t_{ON}$ varies):

curve 1: DC=0.024; E=0.017;
curve 2: DC=0.04; E=0.03;
curve 3: DC=0.083; E=0.058;
curve 4: DC=0.167; E=0.12;
curve 5: DC=1; E=0.696.

The plasma was switched on at a time approximately equal to zero seconds from the acquisition of the concentrations of ozone, and the duration of the discharge was variable and between 2 and 10 minutes, depending on the chosen conditions.

It can be noted that, with fixed supply of power to the electrodes and fixed air flow, the DC value, which determines E, modifies the dynamics of the production of ozone, as well as the value of saturation. In particular, saturation depends above all on the switch-off time $t_{OFF}$.

Under the condition of continuous generation (DC=1), that is with E=0.696 W·h/$m^3$, outside the scope of the invention, the values of the ozone saturation are between 2.5 and 3 ppmv.

In FIG. 2 it is noted instead that, for values E<0.5 W·h/$m^3$ (curves 1-4), the build-up of ozone is slower and reaches values of saturation that are lower than in the case of continuous generation; in particular, an ozone content lower than 0.2 ppmv for E=0.058 (and lower E values) and lower than 0.5 ppmv for E=0.12 is obtained.

Example 2

This example refers to the evaluation of the amount of ozone produced with a low power plasma and in the presence of an external air flow.

The plasma was generated in a dynamic configuration with an external air flow such as to determine an overall flow rate Q of 50 $m^3$/h. The SDBD system is similar to that of Example 1, with the only difference that the two electrodes that generate the plasma are the same and both have side dimensions 12×3 cm and a thickness of 0.11 mm.

The generator frequency has been set at 32 kHz. The graphs show the ozone detected with the Eco-Sensors sensor model OS-6, for different DCs for two values of switch-off times $t_{OFF}$=100 ms and $t_{OFF}$=1000 ms, with generation times $t_{ON}$ between 10 and 500 ms.

The pulsed mode mainly modifies the speed of ozone production and, acting also on the $t_{OFF}$ it is possible to modify the condition of ozone saturation in the plasma.

Six different DC values (0.048, 0.09, 0.12, 0.17, 0.33 and 1), obtained for different switch-off times $t_{OFF}$ (100 ms, 500 ms, 1000 ms), were obtained and therefore for different switch-on times $t_{ON}$. In this way it was possible to evaluate the dependence of the ozone content in the air both on the DC and on the discharge parameters. Each treatment lasted about 10 minutes.

Figure 3:
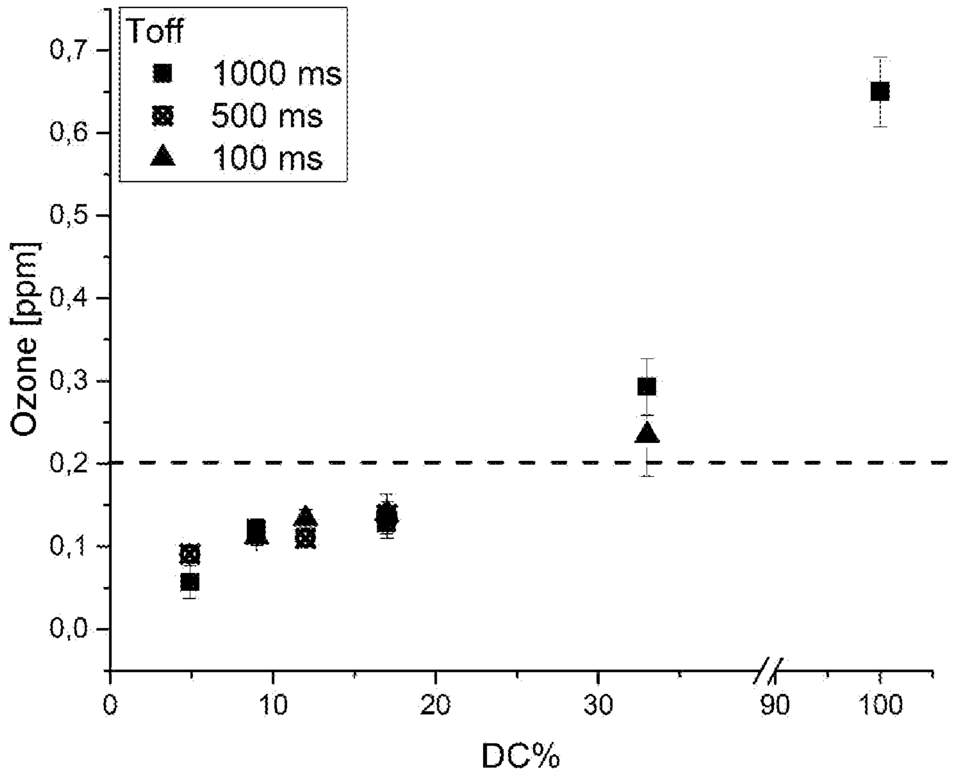

FIG. 3 shows the graphs of the ozone measurements at the outlet from the plasma. The plasma is switched on at t=60 s. It is observed that the limit value of 0.2 ppmv (dotted line in the figure) is exceeded for DC=0.33 and DC=1. In the other cases the ozone value is always below this threshold, and is also stable over time.

When the plasma is switched off, a fairly rapid decrease in ozone concentration is observed.

The invention claimed is:

1. A method for the production of a cold plasma with an ozone content lower than 0.5 ppmv, the method implemented by a Surface Dielectric Barrier Discharge (SDBD) system and comprising creating a plasma in an oxygen-containing gas at an overall pressure between 0.9 and 2 bar and powering two electrodes that generate the plasma with alternate voltage, such that the relation $E=P\times DC/Q\leq 0.1$ is met, wherein:

E is the energy transferred to a unit volume of the oxygen-containing gas and has units $Wh/m^3$;

P is the nominal power in Watt delivered by the SDBD system;

DC is a number higher than 0 and equal to or lower than 0.95, is the fraction of time during which the power P is actually transferred to the SDBD system, and is defined by the relation $DC=t_{oN}/(t_{oN}+t_{OFF})$, in which $t_{ON}$ is the duration of the period in which power is transferred to the SDBD system and toFF is the is the duration of the period in which there is no power transfer to the SDBD system;

Q is the total flow rate of the oxygen-containing gas circulating in the SDBD system and is measured in cubic meters per hour; and $P_f$ is the power per unit length of the electrodes and is between 2 and 6 W/cm.

2. The method according to claim 1, wherein said ozone content is lower than 0.2 ppmv.

3. The method according to claim 1, wherein said alternate tension voltage has a frequency between 1 and 500 kHz.

4. The method according to claim 1, wherein DC is between 0.1 and 0.95.

5. The method according to claim 1, wherein $t_{OFF}$ is between 25 ms and 500 ms.

6. The method according to claim 1, wherein the values of $t_{ON}$ and $t_{OFF}$ are kept constant during the whole period of production of plasma in the oxygen-containing gas.

7. The method according to claim 1, wherein the values of $t_{ON}$ and $t_{OFF}$ are varied during the period of production of plasma in the oxygen-containing gas.

8. The method according to claim 7, wherein a $t_{OFF}$ period lasting more than 1000 ms is imposed every n cycles, with n>5.

* * * * *